(12) United States Patent (10) Patent No.: US 12,412,487 B2
Kikuchi et al. (45) Date of Patent: Sep. 9, 2025

(54) SECRET CALCULATION SYSTEM, APPARATUS, METHOD AND PROGRAM

(71) Applicant: NIPPON TELEGRAPH AND TELEPHONE CORPORATION, Tokyo (JP)

(72) Inventors: Ryo Kikuchi, Musashino (JP); Dai Ikarashi, Musashino (JP); Hiroki Sudo, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 18/574,762

(22) PCT Filed: Jul. 8, 2021

(86) PCT No.: PCT/JP2021/025769
§ 371 (c)(1),
(2) Date: Dec. 28, 2023

(87) PCT Pub. No.: WO2023/281693
PCT Pub. Date: Jan. 12, 2023

(65) Prior Publication Data
US 2025/0131855 A1  Apr. 24, 2025

(51) Int. Cl.
*H04L 29/06* (2006.01)
*G06F 17/16* (2006.01)
*G09C 5/00* (2006.01)

(52) U.S. Cl.
CPC ............... *G09C 5/00* (2013.01); *G06F 17/16* (2013.01)

(58) Field of Classification Search
None
See application file for complete search history.

(56) References Cited

U.S. PATENT DOCUMENTS 9,043,250 B2 * 5/2015 Ling .................. G06F 21/6254
703/2
11,038,679 B2 * 6/2021 Li ........................... G06F 7/582
(Continued)

OTHER PUBLICATIONS

Kikuchi et al., "Secure cross-sector customer-flow invention", Symposium on Cryptography and Information Security, The Institute of Electronics, Information and Communication Engineers, Jan. 28-31, 2020, pp. 1-8 (16 pages including English Translation).

*Primary Examiner* — Maung T Lwin
(74) *Attorney, Agent, or Firm* — XSENSUS LLP (57) ABSTRACT

A secure computation device $1_n$ of a secure computation system according to an aspect of this invention includes a first calculation unit $11_n$, a second calculation unit $12_n$, a third calculation unit $13_n$, a fourth calculation unit $14_n$, a fifth calculation unit $15_n$, a sixth calculation unit $16_n$, a seventh calculation unit $17_n$, and an output unit $18_n$. By calculation being performed in cooperation of these, a group by count operation can be performed on a table to which a flag is added.

6 Claims, 8 Drawing Sheets

(56) References Cited

U.S. PATENT DOCUMENTS

| | | | |
|---|---|---|---|
| 11,784,800 B2* | 10/2023 | Wright | G06N 7/01 380/28 |
| 2013/0246802 A1* | 9/2013 | Kerschbaum | H04L 9/00 713/189 |
| 2021/0390465 A1* | 12/2021 | Werder | H04L 67/562 |

* cited by examiner

ALGORITHM (WITHOUT null PROCESSING)

1: $[[k^\uparrow\rightarrow]]\leftarrow$BITDECOMP$([k^\rightarrow])$
2: $[[f^*\rightarrow]]\leftarrow 1-[[f^\rightarrow]]$
3: $\langle\pi\rangle\leftarrow$GENPERM$([[f^*\rightarrow]], [[k^\uparrow\rightarrow]])$
4: $([[k^{\uparrow\prime}\rightarrow]], [[k'^\rightarrow]], [[f'^\rightarrow]])\leftarrow$SORT$(\langle\pi\rangle, ([[k^\uparrow\rightarrow]], [[k^\rightarrow]], [[f^\rightarrow]]))$
5: each $1\leq i\leq m-1$ do
6: $\quad [[e_i]]\leftarrow$IFTHEN$([[f'_i]]:$EQ$([[k'_i]], [[k'_{i+1}]]), [[1]])$
7: $\quad [[e'_i]]\leftarrow$IFTHEN$([[f'_i]]$XOR$[[f'_{i+1}]]:[[0]], [[e_i]])$
8: $\quad [e^?_i]\leftarrow$MODCONV$([[e'_i]])$
9: $[[e'_m]]=1-[[f'_m]]$
10: $[e^?_m]\leftarrow$MODCONV$([[e'_m]])$
11: $[f^*]\leftarrow$MODCONV$(1-[[f^\rightarrow]])$
12: $[m']=m-\sum_{i=1}^{m}[f^*_i]$
13: each $1\leq i\leq m$ do
14: $\quad [x_i]\leftarrow$IFTHEN$([e^?_i]:[m'], [i])$
15: $\langle\pi'\rangle\leftarrow$GENPERM$([[e^?\rightarrow]])$
16: $([x^\rightarrow], [[e''^\rightarrow]], [k''^\rightarrow])\leftarrow$SORT$(\langle\pi'\rangle, ([x^\rightarrow], [[e'^\rightarrow]], [k'^\rightarrow]))$
17: $[c_1]=[x'_1]$
18: each $2\leq i\leq m$ do
19: $\quad [c_i]=[x'_i]-[x'_{i-1}]$
20: $[[e'''^\rightarrow]]=1-[[e''^\rightarrow]]$
21: Output $([k''^\rightarrow], [c^\rightarrow], [[e'''^\rightarrow]])$

Fig. 3

ALGORITHM (WITH null PROCESSING)

1: $[[k^\dagger{}^\rightarrow]] \leftarrow \text{BITDECOMP}([k^\rightarrow])$
2: $[[f^{*\rightarrow}]] \leftarrow 1 - [[f^\rightarrow]]$
3: $\langle \pi \rangle \leftarrow \text{GENPERM}([[f^{*\rightarrow}]], [[k^\dagger{}^\rightarrow]])$
4: $(([k^\rightarrow]], [k^\rightarrow], [[f^\rightarrow]]) \leftarrow \text{SORT}(\langle \pi \rangle, (([k^\dagger{}^\rightarrow]], [k^\rightarrow], [[f^\rightarrow]]))$
5: each $1 \leq i \leq m-1$ do
6: $\quad [[e_i]] \leftarrow \text{IFTHEN}([[f'_i]] : \text{EQ}([[k'_i]], [[k'_{i+1}]]), [[1]])$
7: $\quad [[e'_i]] \leftarrow \text{IFTHEN}([[f'_i]]) \text{XOR}([[f'_{i+1}]] : [[0]], [[e_i]])$
8: $\quad [e'_i] \leftarrow \text{MODCONV}([[e'_i]])$
9: $[[e'_m]] = 1 - [[f'_m]]$
10: $[e'_m] \leftarrow \text{MODCONV}([[e'_m]])$
11: $[f^*] \leftarrow \text{MODCONV}(1 - [[f'^\rightarrow]])$
12: $[m'] = m - \sum_{i=1}^m [f^*_i]$
13: each $1 \leq i \leq m$ do
14: $\quad [x'_i] \leftarrow \text{IFTHEN}([e'_i] : [m'], [i])$
$\quad [k'_i] \leftarrow \text{IFTHEN}([e'_i] : [\text{null}], [k'^\rightarrow_i])$
15: $\langle \pi' \rangle \leftarrow \text{GENPERM}([[e'^\rightarrow]])$
16: $(([x'^\rightarrow], [[e'^\rightarrow]], [k'^\rightarrow]) \leftarrow \text{SORT}(\langle \pi' \rangle, ([x'^\rightarrow], [[e'^\rightarrow]], [k'^\rightarrow]))$
17: $[c_1] = [x'_1]$
18: each $2 \leq i \leq m$ do
19: $\quad [c_i] = [x'_i] - [x'_{i-1}]$
20: $[[e''^\rightarrow]] = 1 - [[e'^\rightarrow]]$
24: Output $([k'^\rightarrow], [c^\rightarrow], [[e''^\rightarrow]])$

| [k''] | [c''] | [[e'''']] |
|---|---|---|
| [1] | [2] | [[1]] |
| [2] | [1] | [[1]] |
| [4] | [2] | [[1]] |
| [null] | [0] | [[0]] |
| [null] | [0] | [[0]] |
| [null] | [0] | [[0]] |
| [null] | [0] | [[0]] |

(a)

| [k'] | [f'] |
|---|---|
| [1] | [1] |
| [1] | [1] |
| [4] | [1] |
| [2] | [0] |
| [4] | [1] |
| [3] | [0] |
| [2] | [1] |

| k | v |
|---|---|
| 1 | 2 |
| 1 | 3 |
| 4 | 4 |
| 4 | 5 |
| 2 | 1 |

(b)

| [k⁻] | [v⁻] |
|---|---|
| [1] | [2] |
| [1] | [3] |
| [4] | [4] |
| [4] | [5] |
| [2] | [1] |

(c)

| [k⁻] | [v⁻] | [f⁻] |
|---|---|---|
| [1] | [2] | [1] |
| [1] | [3] | [1] |
| [4] | [4] | [1] |
| [2] | [2] | [0] |
| [4] | [5] | [1] |
| [3] | [2] | [0] |
| [2] | [1] | [1] |

Fig. 7

Fig. 8

SECRET CALCULATION SYSTEM, APPARATUS, METHOD AND PROGRAM

CROSS-REFERENCE TO RELATED APPLICATION

The present application is based on PCT filing PCT/JP2021/025769, filed Jul. 8, 2021, the entire contents of which are incorporated herein by reference.

TECHNICAL FIELD

The present invention relates to a technology for performing a database operation while keeping data secret.

BACKGROUND ART

In order to handle data safely, technologies called secure computation in which analysis is performed in a state in which encryption is performed have been studied. Among them, encrypted database processing is considered in order to efficiently perform extraction of data that satisfies conditions, calculation of a total value, and the like in a state in which encryption is performed.

A group by operation that is a type of database (DB) processing is grouping processing in which a table is used as an input, grouping is performed for each value of a designated column, and in some cases, a statistical value for each group is calculated and output in a table format.

Non Patent Literature 1 proposes a method of performing a group by operation in a state in which encryption is performed. An input/output considered here is a table obtained by encrypting a normal table for each element.

On the other hand, in a case where database processing is performed in a state in which encryption is performed, it is conceivable that a flag indicating whether a certain record is an original output is added to the input/output unlike a normal table.

As data in which [·] is encrypted with $\vec{k}$ set as a vector of a key, $\vec{v}$ set as a vector of a value, and $\vec{f}$ set as a vector of a flag, FIG. 7(a) illustrates an example of a normal unencrypted table, FIG. 7(b) illustrates an example of an encrypted table in Non Patent Literature 1, and FIG. 7(c) illustrates an example of a table to which flags are added.

Figure 7:
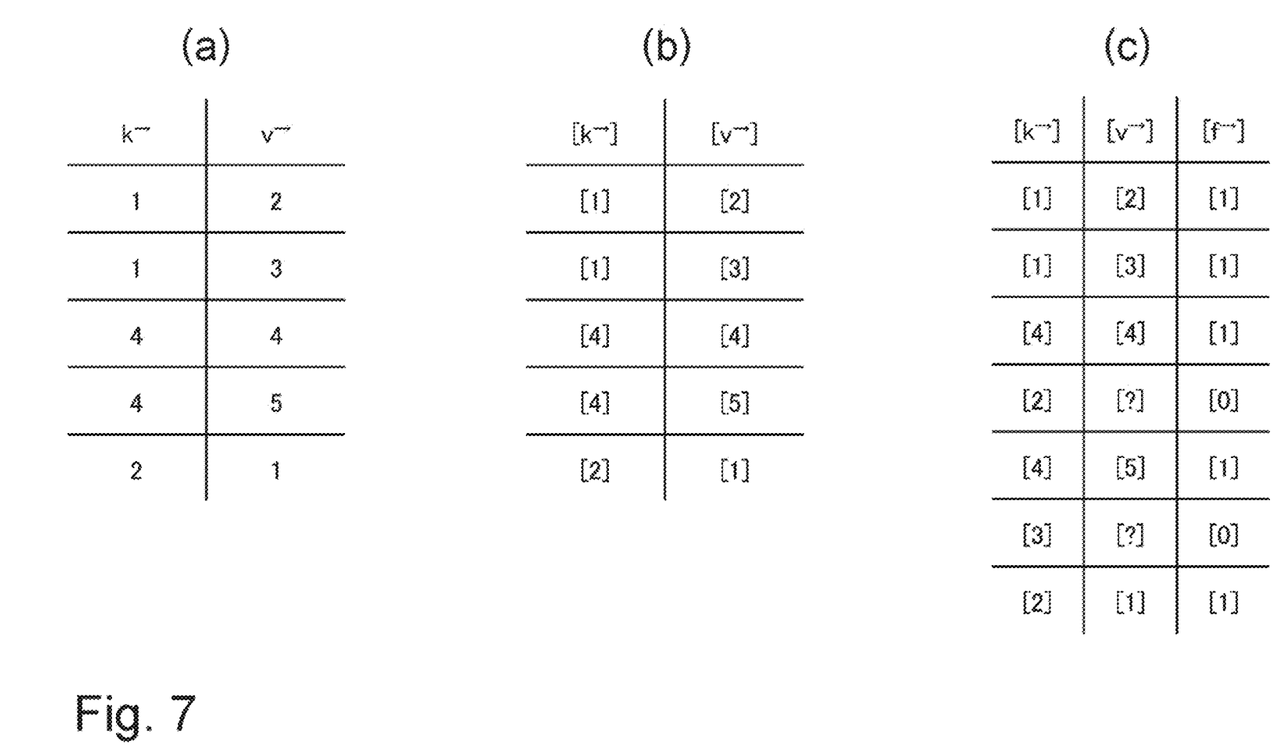
FIG. 7 is a diagram for describing Background Art.

In FIG. 7, "?" indicates that some value is inserted. In a case where the flag is 0, the value of the record is ignored, and thus the value of "?" is any value.

CITATION LIST

Non Patent Literature

Non Patent Literature 1: Ryo Kikuchi, Koki Hamada, Dai Ikarashi, Gen Takahashi, Katsumi Takahashi, "Oudanteki dousen bunseki wo himitsu keisan de yattemiyou (Secure cross-sector customer-flow invention)" In SCIS, 2020.

SUMMARY OF INVENTION

Technical Problem

In a case where the table to which the flags are added illustrated in FIG. 7(c) is input, an algorithm proposed in Non Patent Literature 1 does not function. This is because, in addition to the different input formats, it has been conventionally assumed that all records are meaningful values, and thus, for example, performing processing while skipping a record that is not used is not possible, and a value of "?" to be ignored affects the final result, and accordingly, the original result cannot be obtained.

An object of the present invention is to provide a secure computation system, device, method, and program that perform a group by count operation on a table to which a flag is added.

Solution to Problem

A secure computation system according to an aspect of this invention is a secure computation system including a plurality of secure computation devices in which m is a number of records and is an integer of 1 or more, $\vec{k}$ is a vector of a key $\vec{k}=(k_1, \ldots, k_m)$, $\vec{f}$ is a vector of a flag $\vec{f}=(f_1, \ldots, f_m)$, $[\alpha]$ is a ciphertext of $\alpha$ with $\alpha$ set as any value or any vector, and a predetermined operation using $\alpha$ as a ciphertext is possible, in which the plurality of secure computation devices includes a plurality of first calculation units that generates a ciphertext $[\vec{f}-]$ and a ciphertext $[\vec{k'}]$ of a vector $\vec{f}$ and a vector $\vec{k'}$ obtained by sorting the vector $\vec{f}$ and the vector $\vec{k}$, respectively, with a vector obtained by concatenating negative of the vector $\vec{f}$ and the vector $\vec{k}$ set as a key, using a ciphertext $[\vec{f}]$ of the vector $\vec{f}$ and a ciphertext $[\vec{k}]$ of the vector $\vec{k}$, a plurality of second calculation units that generates a ciphertext $[\vec{e'}]$ of a vector $\vec{e'}$ including $e_i$ (i 1, ..., m) as an element by generating a ciphertext $[e'_m]$ of $e'_m$ such that $e'_i=0$ is satisfied when $f'_i=1$ and $k'_i \neq k'_{i+1}$ or $f'_i=1$ and $f'_{i+1}=0$ are satisfied or otherwise $e'_i=1$ is satisfied, and $e'_m=0$ is satisfied when $f'_m=1$ is satisfied or otherwise $e'_m=1$ is satisfied, with $i=1, \ldots, m-1$ set, using the ciphertext $[\vec{f}-]$ and the ciphertext $[\vec{k'}]$, a plurality of third calculation units that generates a ciphertext $[m']$ of m' with a result obtained by subtracting a number of records having a flag of 0 from the m set as m', using at least the m, a plurality of fourth calculation units that generates a ciphertext $[\vec{x}]$ of a vector $\vec{x}$ including $x_i$ (i=1, ..., m) as an element by generating a ciphertext $[x_i]$ of having a value of i when an element $e_i=0$ is satisfied, the element $e_i$ being an element of the vector $\vec{e}$, and a value of m' when an element $e_i=1$ is satisfied, the element $e_i$ being an element of the vector $\vec{e}$, with $i=1, \ldots, m$ set, using the ciphertext $[\vec{e'}]$, a plurality of fifth calculation units that obtains a ciphertext $[\vec{x'}]$, a ciphertext $[\vec{k''}]$, and a ciphertext $[\vec{e''}]$ of a vector $\vec{x'}$, a vector $\vec{k''}$, and a vector $\vec{e''}$ obtained by sorting the vector $\vec{x}$, the vector $\vec{k'}$, and the vector $\vec{e'}$, respectively, with the vector $\vec{e'}$ set as a key, using the ciphertext $[\vec{e'}]$, the ciphertext $[\vec{x}]$, and the ciphertext $[\vec{k'}]$, a plurality of sixth calculation units that generates a ciphertext $[\vec{c}]$ of a vector $\vec{c}$ including $c_i$ i=1, ..., m) as an element by generating a ciphertext $[c_i]$ of $c_i$ that is a value obtained by subtracting an element $x'_{i-1}$ from an element $x'_i$ of the vector $\vec{x'}$ with a ciphertext $[x'_1]$ of an element $x'_1$ of the vector $\vec{x'}$ set as a ciphertext $[c_1]$ and with $i=2, \ldots, m$ set, using the ciphertext $[\vec{x'}]$, and a plurality of seventh calculation units that calculates a ciphertext $[\vec{e'''}]$ of a vector $\vec{e'''}$ including a value obtained by subtracting each element of the vector $\vec{e''}$ from 1, using the ciphertext $[\vec{e''}]$.

Advantageous Effects of Invention

A group by count operation can be performed on a table to which a flag is added.

DESCRIPTION OF EMBODIMENTS

Hereinafter, an embodiment of the present invention will be described in detail. In the drawings, components having the same functions are denoted by the same reference numerals, and redundant description will be omitted.

Note that the symbol "$\rightarrow$" used in the sentences should be originally placed immediately above the character, but is placed immediately following the character due to limitations of text notation.

Encrypted data is written as [x], a vector is written as $\vec{x}=(x_1, \ldots, x_n)$, and $[\vec{x}]=([x_1], \ldots, [x_n])$ is set.

It is assumed that encryption is performed by a method in which the following operations can be performed in a state in which encryption is performed, such as secret sharing (for example, Reference Literature 1) or homomorphic encryption (for example, Reference Literature 2). In a case where · of a ciphertext [·] is a bit value, the ciphertext [·] may be described as a ciphertext [[·]]. Furthermore, description of $<\pi>$ may be used for permutation. · is any value or vector. Different encryption may be used for values to be stored. That is, all of the encryption may or may not be the same.

That is, [α] is a ciphertext of α with a set as any value or any vector, and $<\beta>$ is a ciphertext of β with β set as any permutation.

<Reference Literature 1> Dai Ikarashi, Ryo Kikuchi, Koki Hamada, and Koji Chida. Actively private and correct MPC scheme in t<n/2 from passively secure schemes with small overhead. IACR Cryptology ePrint Archive, Vol. 2014, p. 304, 2014.

<Reference Literature 2> Zvika Brakerski, Craig Gentry, and Vinod Vaikuntanathan. Fully homomorphic encryption without bootstrapping. Electronic Colloquium on Computational Complexity (ECCC), Vol. 18, p. 111, 2011.

It is assumed that secret sharing and homomorphic encryption are supported regarding addition/subtraction and constant multiplication. That is, it is assumed that relationship of c[a]±[b]±d=[ca±b±d] is established.

Multiplication can be calculated by a method described in Reference Literature 1 in a case of secret sharing, or by a homomorphic operation in a case of homomorphic encryption. Multiplication is described as [c]←Mult([a], [b]). Here, c=ab.

Stable sort is processing of rearranging an input $[\vec{x}]=([x_1], \ldots, [x_n])$ into $[\vec{x}']=([x_1'], \ldots, [x_n'])$ such that $x_i' \leq x_{i+1}'$ is satisfied for i∈{1, ..., n−1}. However, when $x_i'=x_{i+1}'$ is satisfied, the original arrangement order of $\vec{x}$ is prioritized.

Stable sort more specifically includes two algorithms (GENPERM, SORT).

GENPERM is a function that outputs a result obtained by encrypting permutation n for rearranging $\vec{x}$. GENPERM is described as $<\pi>\leftarrow$GENPERM($[\vec{x}]$).

SORT is a function that calculates $\vec{x}'$ obtained by applying π to $\vec{x}$ and performing rearrangement in a state in which encryption is performed. SORT is described as, for example, $[\vec{x}']\leftarrow$SORT($<\pi>$, $[\vec{x}]$).

For simplicity of description, in a case of sorting each of a plurality of vectors using the same permutation, SORT is described as, for example, $$[\vec{x}'], [\vec{y}']) \leftarrow \text{SORT}(<\pi>, ([\vec{x}], [\vec{y}]))$$

An obvious configuration method of SORT is a method in which a sorting network is used. Furthermore, in a case of secret sharing, SORT can be efficiently performed by a method described in Reference Literature 3.

<Reference Literature 3> Koji Chida, Koki Hamada, Dai Ikarashi, Ryo Kikuchi, Naoto Kiribuchi, and Benny Pinkas. An efficient secure three-party sorting protocol with an honest majority. IACR Cryptology ePrint Archive, Vol. 2019, p. 695, 2019.

Equal sign determination EQ is a function that outputs a ciphertext [e] of e such that 1 is obtained when x=y is satisfied and 0 is obtained when x≠y is satisfied using [x], [y] as an input. EQ is described as, for example, [e]←EQ([x], [y]). Here, e is 1 when x=y is satisfied, and is 0 when x≠y is satisfied.

In a case where equal sign determination of a plurality of elements is performed, EQ is described as, for example, [e]←EQ([a], [b]), ([c], [d]). Here, e is 1 when a=c and b=d are satisfied or otherwise 0.

In general, if data is encrypted in bit representation, equal sign determination can be performed by circuit calculation being performed to determine whether each bit of [x−y] is 0. The circuit calculation can be performed by calculation by addition/subtraction and multiplication.

In a case where encryption is performed in integer representation, equal sign determination can be performed by change to bit representation being made using bit decomposition (see, for example, Reference Literature 4) and circuit calculation being performed in the same manner.

<Reference Literature 4> Ryo Kikuchi, Dai Ikarashi, Takahiro Matsuda, Koki Hamada, and Koji Chida. Efficient bitdecomposition and modulus-conversion protocols with an honest majority. In ACISP 2018, pp. 64-82, 2018.

In addition, in a case where encryption is performed on mod p, equal sign determination can be performed even if $[(x-y)^{p-1}]$ is calculated using multiplication.

IFTHEN is a function that receives a flag [f] (where f∈{0,1}) and [x], [y] as inputs and outputs [x] when f=1 is satisfied and [y] when f=0 is satisfied. IFTHEN is described as, for example, [e]←IFTHEN([f]: [x], [y]). Here, e is x when f=1 is satisfied and is y when f=0 is satisfied.

IFTHEN can be implemented by, for example, $$\text{Mult}([f], [x]) + \text{Mult}([1-f], [y]).$$

MODCONV is a function that generates [a] that is encryption of the same value but differs in the form of the ciphertext using encryption [[a]] of a bit value as an input. In other words, MODCONV is a function that generates a ciphertext [a] of a value in which a is represented in an integer using a ciphertext [[a]] of a bit value as an input. MODCONV is described as, for example, [a]←MODCONV([[a]]).

BITDECOMP is a function that generates [[a]] that is encryption of the same value in which a is represented in a bit but differs in the form of the ciphertext using encryption [a] of an integer value as an input. In other words, BITDECOMP is a function that generates a ciphertext [[a]] of a value in which a is represented in a bit using a ciphertext

[[a]] of a bit value as an input. BITDECOMP is described as, for example, [[$k^\rightarrow$]]←BITDECOMP([$k^\rightarrow$]). However, when $k^\rightarrow=(k_1, k_2, \ldots, k_L)$ is satisfied, $k=\Sigma_{i=1}^{L}2^{i-1}k_i$ is satisfied.

The number of records of a table to be processed by the secure computation system, device, method, and program is m. It is assumed that this table includes at least a ciphertext [$k^\rightarrow$] of a vector $k^\rightarrow$ of a key and a ciphertext [$f^\rightarrow$] of a vector $f^\rightarrow$ of a flag. It is assumed that elements of the ciphertext [$f^\rightarrow$] are bit ciphertexts. If a bit does not appear, conversion into bits is performed by a bit decomposition protocol.

Figure 5:
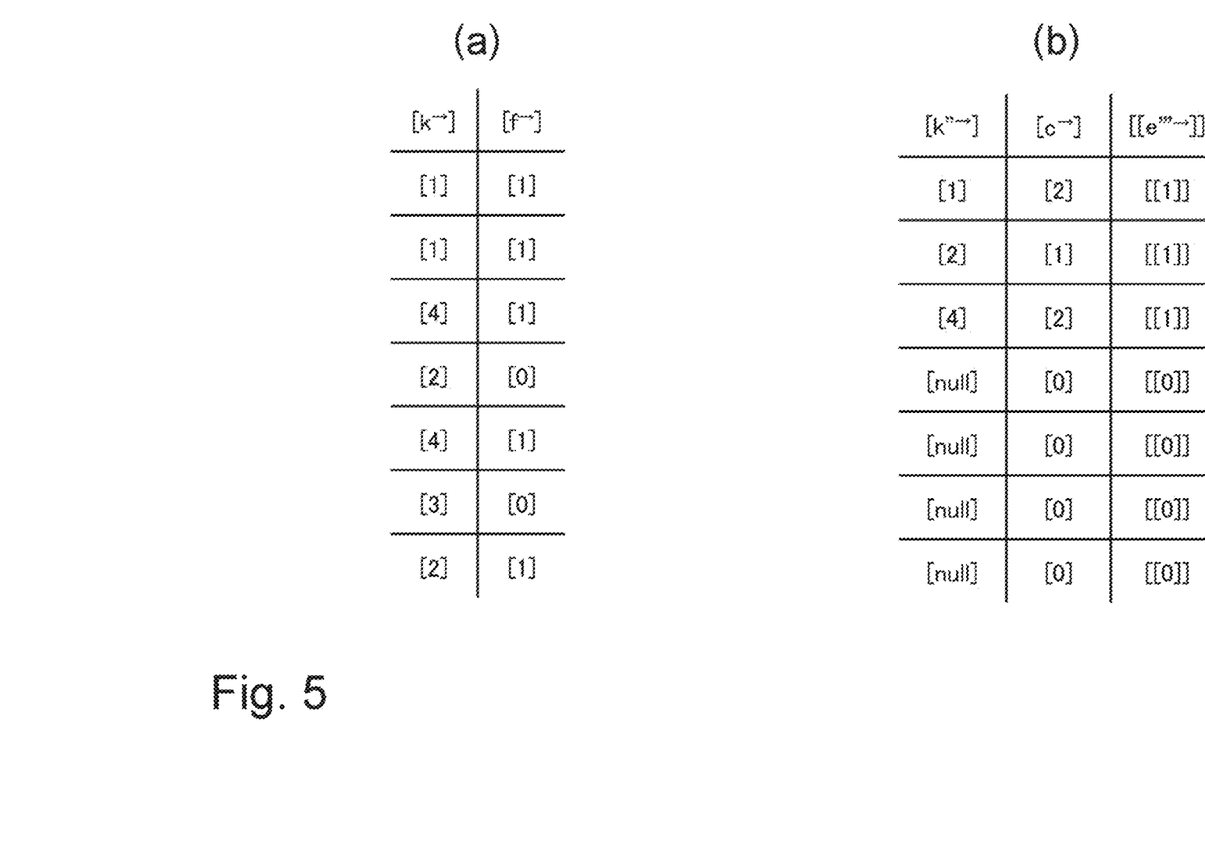
FIG. 5 is a diagram for describing an example of an input and an example of an output.

The table to be processed by the secure computation system, device, method, and program is illustrated in FIG. 5(a). Since no value is used in a group by count operation, only the ciphertext [$k^\rightarrow$] of the key $k^\rightarrow$ and the ciphertext [$f^\rightarrow$] of the flag $f^\rightarrow$ are described in the table illustrated in FIG. 5(a).

For example, a table illustrated in FIG. 5(b) is obtained from the table illustrated in FIG. 5(a) by a group by count operation by the secure computation system, device, method, and program. [$k"^\rightarrow$] is a ciphertext of a vector $k"^\rightarrow$ obtained by rearranging elements of the vector $k^\rightarrow$ of a key. [$c^\rightarrow$] is a ciphertext or a vector $c^\rightarrow$ including the number of counts. [[$e"^\rightarrow$]] is a ciphertext of a vector $e"^\rightarrow$ of a flag corresponding to the vector $k"^\rightarrow$.

In FIG. 5(a), the number of keys of [1] of the ciphertext [$k"^\rightarrow$] is two, the number of keys of [2] of the ciphertext [$k"^\rightarrow$] is one, and the number of keys of [3] of the ciphertext [$k"^\rightarrow$] is four.

Therefore, in FIG. 5(b), an element of the ciphertext [$c^\rightarrow$] corresponding to [1] of the ciphertext [$k"^\rightarrow$] is [2], an element of the ciphertext [$c^\rightarrow$] corresponding to [2] of the ciphertext [$k"^\rightarrow$] is [1], and an element of the ciphertext [$c^\rightarrow$] corresponding to [4] of the ciphertext [$k"^\rightarrow$] is [2].

Figure 1:
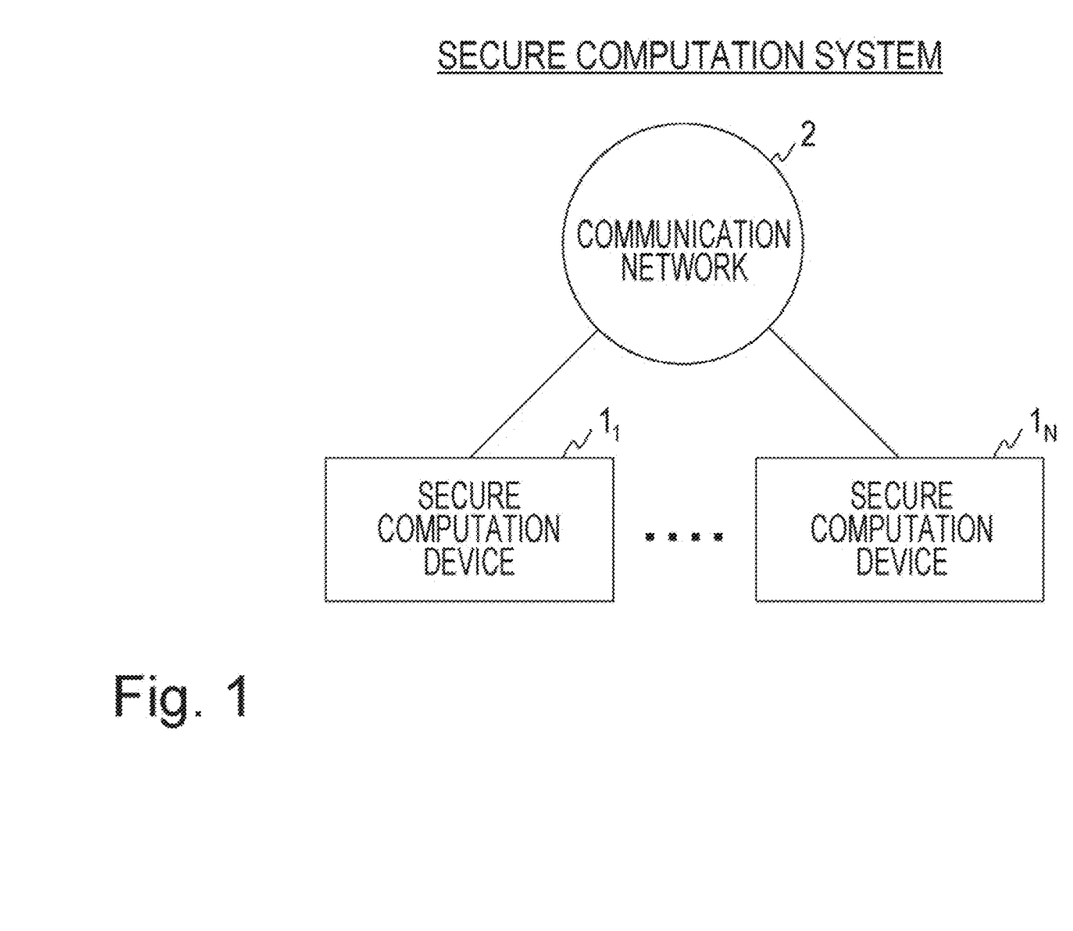
FIG. 1 is a diagram illustrating an example of a functional configuration of a secure computation system.

A configuration example of the secure computation system and method will be described with reference to FIG. 1. This secure computation system and method perform a so-called group by count operation by secure computation.

The secure computation system includes N (≥2) secure computation devices $1_1, \ldots, 1_N$. In the present embodiment, each of the secure computation devices $1_1, \ldots, 1_N$ is connected to a communication network 2. The communication network 2 is a circuit-switching or packet-switching communication network configured such that the connected devices can perform communication with each other, and is, for example, the Internet, a local area network (LAN), a wide area network (WAN), or the like. Note that the devices do not necessarily need to perform online communication via the communication network 2. For example, information to be input to the secure computation devices $1_1, \ldots, 1_N$ may be stored in a portable recording medium such as a magnetic tape or a USB memory, and the information may be input in an offline manner from the portable recording medium to the secure computation devices $1_1, \ldots, 1_N$.

Figure 2:
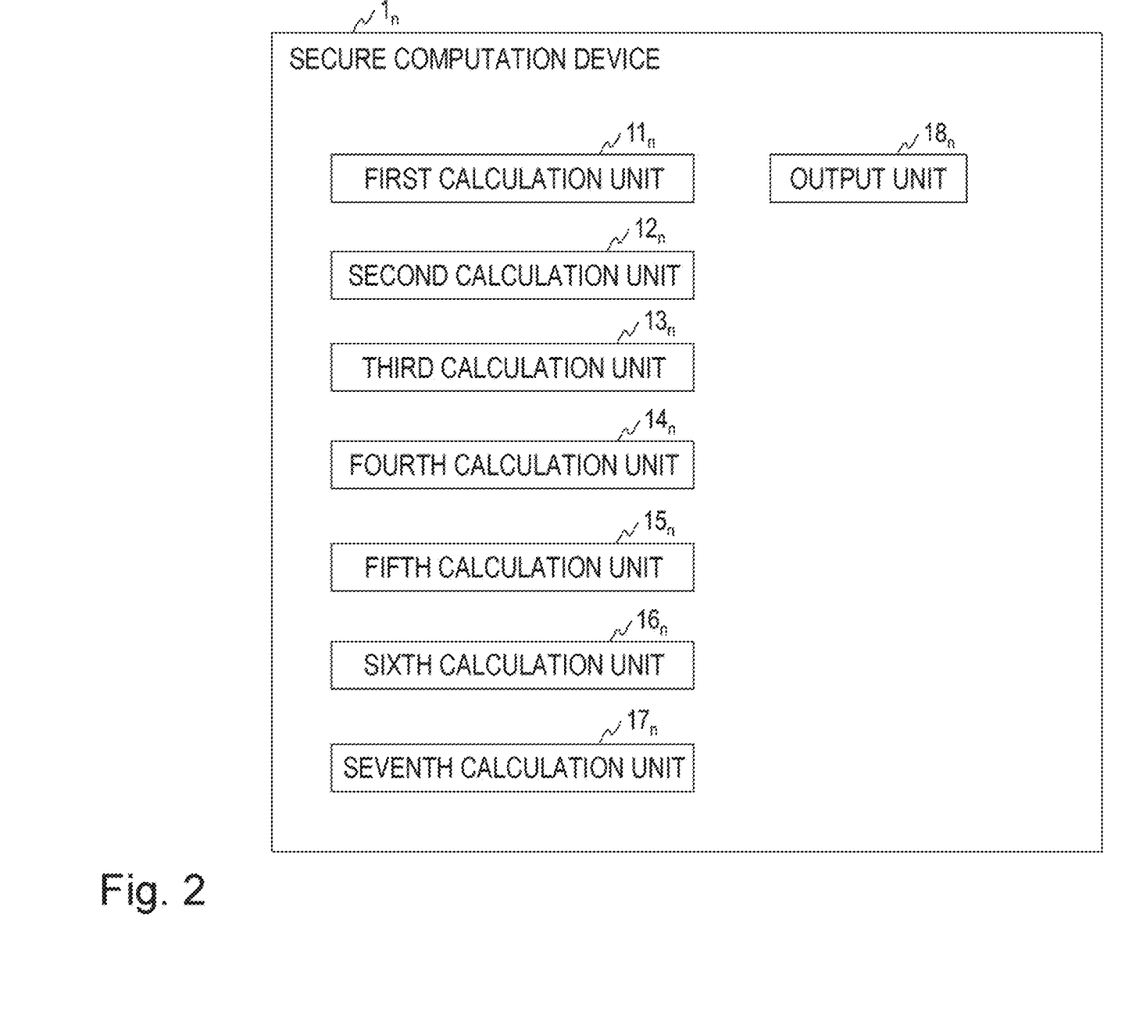
FIG. 2 is a diagram illustrating an example of a functional configuration of a secure computation device.

A configuration example of a secure computation device $1_n$ (n=1, ..., N) included in the secure computation system will be described with reference to FIG. 2. For example, as illustrated in FIG. 2, the secure computation device $1_n$ of the secure computation system includes a first calculation unit $11_n$, a second calculation unit $12_n$, a third calculation unit $13_n$, a fourth calculation unit $14_n$, a fifth calculation unit $15_n$, a sixth calculation unit $16_n$, a seventh calculation unit $17_n$, and an output unit $18_n$.

Figure 6:
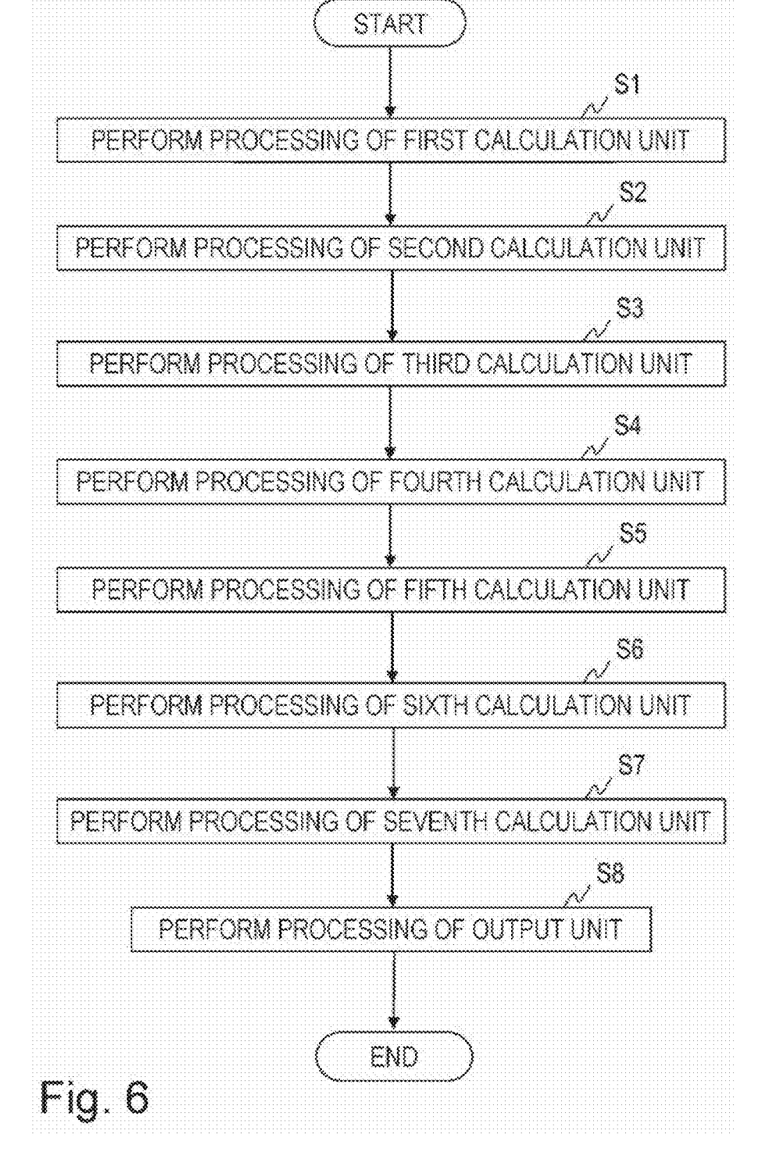
FIG. 6 is a diagram illustrating an example of a processing procedure of a secure computation method.

The components of the secure computation device $1_n$ (1≤n≤N) perform processing of each step described below and illustrated in FIG. 6 in cooperation with components of another secure computation device $1_{n'}$ (n'=1, ..., N, provided that n≠n' is satisfied), thereby implementing secure computation of the embodiment.

Note that the processing of each step is performed by secure computation. That is, the secure computation device $1_n$ performs the processing of each step without restoring a ciphertext, in other words, without knowing the content of a ciphertext.

The secure computation device $1_n$ is a special device configured such that a special program is loaded into a known or dedicated computer including, for example, a central processing unit (CPU), a main storage device (random access memory (RAM)), and the like. The secure computation device $1_n$ performs each piece of processing under control of the central process ng unit, for example. Data input into the secure computation device $1_n$ and data obtained in each piece of the processing are stored in, for example, the main storage device, and the data stored in the main storage device is read to the central processing unit as necessary and used for other processing. At least some of the components of the secure computation device $1_n$ may be configured by hardware such as an integrated circuit.

<First Calculation Units $11_1, \ldots, 11_N$>

A ciphertext [$f^\rightarrow$] of a vector $f^\rightarrow$ and a ciphertext [$k^\rightarrow$] of a vector $k^\rightarrow$ are input to a plurality of first calculation units $11_1, \ldots, 11_N$.

The plurality of first calculation units $11_1, \ldots, 11_N$ generates a ciphertext [$f'^\rightarrow$] and a ciphertext [$k'^\rightarrow$] of a vector $f'^\rightarrow$ and a vector $k'^\rightarrow$ obtained by sorting the vector $f^\rightarrow$ and the vector $k^\rightarrow$, respectively, with a vector obtained by concatenating the negative of the vector $f^\rightarrow$ and the vector $k^\rightarrow$ set as a key, using the ciphertext [$f^\rightarrow$] of the vector $f^\rightarrow$ and the ciphertext [$k^\rightarrow$] of the vector $k^\rightarrow$ (step S1).

Figure 3:
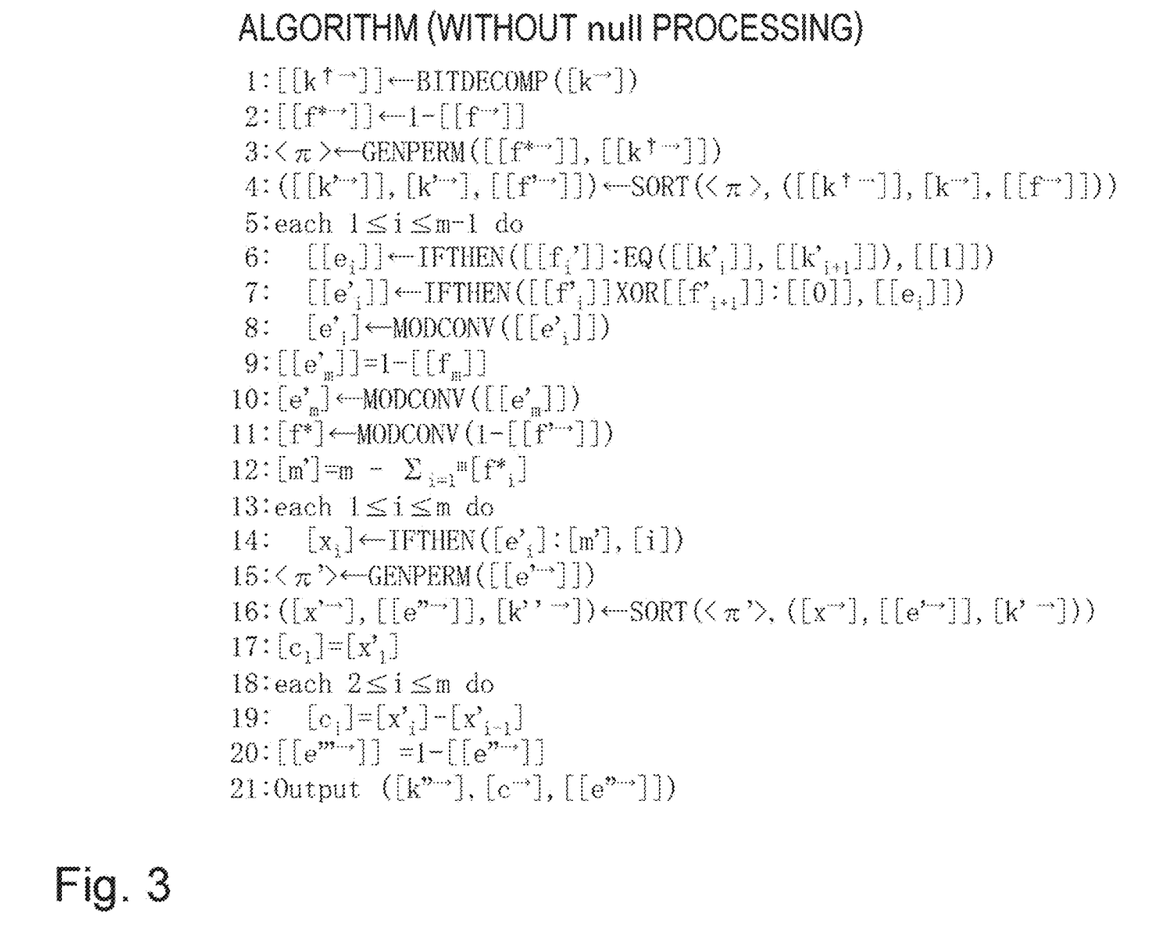
FIG. 3 is a view illustrating an example of an algorithm.

This processing by the plurality of first calculation units $11_1, \ldots, 11_N$ is implemented, for example, by processing from "1:" to "4:" in FIG. 3.

That is, the plurality of first calculation units $11_1, \ldots, 11_N$, for example, performs the following processing.

1: $[[k^{\dagger\rightarrow}]] \leftarrow BITDECOMP([k^\rightarrow])$

2: $[[f^{*\rightarrow}]] \leftarrow 1 - [[f^\rightarrow]]$

3: $<\pi> \leftarrow GENPERM([[f^{*\rightarrow}]], [[k^{\dagger\rightarrow}]])$

4: $([[k'^\rightarrow]], [k'^\rightarrow], [[f'^\rightarrow]]) \leftarrow SORT(<\pi>, ([[k^{\dagger\rightarrow}]], [k^\rightarrow], [[f^\rightarrow]]))$ In the example of FIG. 3, a ciphertext [[$f'^\rightarrow$]] is generated as the ciphertext [$f'^\rightarrow$]. Furthermore, in the example of FIG. 3, a ciphertext [[$k'^\rightarrow$]] and a ciphertext [$k'^\rightarrow$] are generated as the ciphertext [$k'^\rightarrow$].

Note that GENPERM([[$f^{*\rightarrow}$]], [[$k^{\dagger\rightarrow}$]]) means processing of generating a ciphertext <π> of permutation n that stably sorts a vector obtained by concatenating the vector $f^{*\rightarrow}$ and the vector $k^{\dagger\rightarrow}$ for each element, using a ciphertext [[$f^{*\rightarrow}$]] and a ciphertext [[$k^{\dagger\rightarrow}$]].

<Second Calculation Units $12_1, \ldots, 12_N$>

The ciphertext [$f'^\rightarrow$] and the ciphertext [$k'^\rightarrow$] are input to a plurality of second calculation units $12_1, \ldots, 12_N$.

The plurality of second calculation units $12_1, \ldots, 12_N$ generates a ciphertext [$e'^\rightarrow$] of a vector $e'^\rightarrow$ including $e_i$ (i=1, ..., m) as an element by generating a ciphertext [$e'_m$] of $e'_m$ such that $e'_i=0$ is satisfied when $f'_i=1$ and $k'_i \neq k'_{i+1}$ or $f'_i=1$ and $f'_{i+1}=0$ are satisfied or otherwise $e'_i=1$ is satisfied, and $e'_m=0$ is satisfied when $f'_m=1$ is satisfied or otherwise $e'_m=1$ is satisfied with i=1, ..., m−1 set, using the ciphertext [$f'^\rightarrow$] and the ciphertext [$k'^\rightarrow$] (step S2).

This processing by the plurality of second calculation units $12_1, \ldots, 12_N$ is implemented, for example, by processing from "5:" to "10:" FIG. 3.

That is, the plurality of second calculation units $12_1, \ldots, 12_N$, for example, performs the following processing.

5: each $1 \le i \le m - 1$ do

6: $[[e_i]] \leftarrow \mathit{IFTHEN}([[f_i']]:\mathit{EQ}([[k_i']], [[k_{i+1}']]), [[1]])$ 7: $[[e_i']] \leftarrow \mathit{IFTHEN}([[f_i']]\mathit{XOR}([[f_{i+1}']]:[[0]]), [[e_i]])$ 8: $[e_i'] \leftarrow \mathit{MODCONV}([[e_i']])$ 9: $[[e_m']] = 1 - [[f_m]]$ 10: $[e_m'] \leftarrow \mathit{MODCONV}([[e_m']])$ <Third Calculation Units $13_1, \ldots, 13_N$>

At least m is input to a plurality of third calculation units $13_1, \ldots, 13_N$.

The plurality of third calculation units $13_1, \ldots, 13_N$ generates a ciphertext [m'] of m' with a result obtained by subtracting the number of records including a flag of 0 from m set as m', using at least m (step S3).

This processing by the plurality of third calculation units $13_1, \ldots, 13_N$ is implemented, for example, by processing from "11:" to "12:", in FIG. 3.

That is, the plurality of third calculation units $13_1, \ldots, 13_N$, for example, performs the following processing.

11: $[f^*] \leftarrow \mathit{MODCONV}(1 - [[f'^{\rightarrow}]])$

12: $[m'] = m - \sum_{i=1}^{m}[f_i^*]$

In this example, a ciphertext $[[f^{\rightarrow}]]$ is further input to the plurality of third calculation units $13_1, \ldots, 13_N$, and the plurality of third calculation units $13_1, \ldots, 13_N$ generates a ciphertext [m'], further using this ciphertext $[[f^{\rightarrow}]]$.

Note that the plurality of third calculation units $13_1, \ldots, 13_N$ may generate the ciphertext [m'] in the same manner as described above, using the ciphertext $[f^{\rightarrow}]$ instead of the ciphertext $[[f^{\rightarrow}]]$.

<Fourth Calculation Units $14_1, \ldots, 14_N$>

A ciphertext [e'] is input to a plurality of fourth calculation units $14_1, \ldots, 14_N$.

The plurality of fourth calculation units $14_1, \ldots, 14_N$ generates a ciphertext $[x^{\rightarrow}]$ of a vector $x^{\rightarrow}$ including $x_i$ ($i=1, \ldots, m$) as an element by generating a ciphertext $[x_i]$ of $x_i$ having a value of i when an element $e_i$ of the vector $e^{\rightarrow}=0$ is satisfied and a value of m' when an element $e_i$ of the vector $e^{\rightarrow}=1$ is satisfied with $i=1, \ldots, m$ set, using the ciphertext $[e'^{\rightarrow}]$(step S4).

This processing by the plurality of fourth calculation units $14_1, \ldots, 14_N$ is implemented, for example, by processing from "13:" to "14:" in FIG. 3.

That is, the plurality of fourth calculation units $14_1, \ldots, 14_N$, for example, performs the following processing.

13: each $1 \le i \le m$ do

14: $[x_i] \leftarrow \mathit{IFTHEN}([e_i']:[m'], [i])$

<Fifth Calculation Units $15_1, \ldots, 15_N$>

The ciphertext $[e'^{\rightarrow}]$, the ciphertext $[x^{\rightarrow}]$, and the ciphertext $[k'^{\rightarrow}]$ are input to a plurality of fifth calculation units $15_1, \ldots, 15_N$.

The plurality of fifth calculation units $15_1, \ldots, 15_N$ generates a ciphertext $[x'^{\rightarrow}]$, a ciphertext $[k''^{\rightarrow}]$, and a ciphertext $[e''^{\rightarrow}]$ of a vector $x'^{\rightarrow}$, a vector $k''^{\rightarrow}$, and a vector $e''^{\rightarrow}$ obtained by sorting the vector $x^{\rightarrow}$, the vector $k'^{\rightarrow}$, and the vector $e'^{\rightarrow}$, respectively, with the vector $e'^{\rightarrow}$ set as a key, using the ciphertext $[e'^{\rightarrow}]$, the ciphertext $[x^{\rightarrow}]$, and the ciphertext $[k'^{\rightarrow}]$ (step S5).

This processing by the plurality of fifth calculation units $15_1, \ldots, 15_N$ is implemented, for example, by processing from "15:" to "16:" in FIG. 3.

That is, the plurality of fifth calculation units $15_1, \ldots, 15_N$, for example, performs the following processing.

15: $<\pi'> \leftarrow \mathit{GENPERM}([[e'^{\rightarrow}]])$

16: $([x'^{\rightarrow}], [[e''^{\rightarrow}]], [k''^{\rightarrow}]) \leftarrow \mathit{SORT}(<\pi'>, ([x^{\rightarrow}], [[e'^{\rightarrow}]], [k'^{\rightarrow}]))$ In the example of FIG. 3, a ciphertext $[[e'^{\rightarrow}]]$ is used as the ciphertext $[e'^{\rightarrow}]$. Furthermore, in the example of FIG. 3, a ciphertext $[[e''^{\rightarrow}]]$ is generated as the ciphertext $[e''^{\rightarrow}]$.

<سixth Calculation Units $16_1, \ldots, 16_N$>

The ciphertext $[x'^{\rightarrow}]$ is input to a plurality of sixth calculation units $16_1, \ldots, 16_N$.

The plurality of sixth calculation units $16_1, \ldots, 16_N$ generates a ciphertext $[c^{\rightarrow}]$ of a vector $c^{\rightarrow}$ including $c_i$ ($i=1, \ldots, m$) as an element by generating a ciphertext $[c_i]$ of $c_i$ that is a value obtained by subtracting an element $x'_{i-1}$ from an element $x'_i$ of the vector $x'^{\rightarrow}$ with the ciphertext $[x'_1]$ of the element $x'_1$ of the vector $x'^{\rightarrow}$ set as a ciphertext $[c_1]$ and with $i=2, \ldots, m$ set, using the ciphertext $[x'^{\rightarrow}]$ (step S6).

This processing by the plurality of sixth calculation units $16_1, \ldots, 16_N$ is implemented, for example, by processing from "17K" to "19:" in FIG. 3.

That is, the plurality of sixth calculation units $16_1, \ldots, 16_N$, for example, performs the following processing.

17: $[c_1] = [x_1']$

18: each $2 \le i \le m$ do

19: $[c_i] = [x_i'] - [x_{i-1}']$

<Seventh Calculation Units $17_1, \ldots, 17_N$>

The ciphertext $[e''^{\rightarrow}]$ is input to a plurality of seventh calculation units $17_1, \ldots, 17_N$.

The plurality of seventh calculation units $17_1, \ldots, 17_N$ calculates the ciphertext $[e'''^{\rightarrow}]$ of a vector $e'''^{\rightarrow}$ including a value obtained by subtracting each element of the vector $e''^{\rightarrow}$ from 1, using the ciphertext $[e''^{\rightarrow}]$ (step 37).

This processing by the plurality of seventh calculation units $17_1, \ldots, 17_N$ is implemented, for example, by processing of "20:" in FIG. 3.

That is, the plurality of seventh calculation units $17_1, \ldots, 17_N$, for example, performs the following processing.

$$20: [[e'''^{\rightarrow}]] = 1 - [[e''^{\rightarrow}]]$$

In the example of FIG. 3, the ciphertext $[[e'^{\rightarrow}]]$ is used as the ciphertext $[e''^{\rightarrow}]$. Furthermore, in the example of FIG. 3, a ciphertext $[[e'''^{\rightarrow}]]$ is generated as the ciphertext $[e'''^{\rightarrow}]$.

<Output Units $18_1, \ldots, 18_N$>

The ciphertext $[k''^{\rightarrow}]$, the ciphertext $[c^{\rightarrow}]$, and the ciphertext $[e'''^{\rightarrow}]$ are input to a plurality of output units $18_1, \ldots, 18_N$.

The plurality of output units $18_1, \ldots, 18_N$ performs output in which the ciphertext $[k''^{\rightarrow}]$, the ciphertext $[c^{\rightarrow}]$, and the ciphertext $[e'''^{\rightarrow}]$ are output (step S8).

Note that the plurality or output units $18_1, \ldots, 18_N$ may output a result obtained by deleting an element corresponding to an element indicating a dummy record among elements $e_i'''$ of the vector $e'''^{\rightarrow}$ from the ciphertext $[k''^{\rightarrow}]$ and the ciphertext $[c^{\rightarrow}]$ using the ciphertext $[k''^{\rightarrow}]$, the ciphertext $[c^{\rightarrow}]$ and the ciphertext $[e'''^{\rightarrow}]$.

In a case where the ciphertext $[k''^{\rightarrow}]$, the ciphertext $[c^{\rightarrow}]$, and the ciphertext $[e'''^{\rightarrow}]$ are, for example, those illustrated in FIG. 5(b), the plurality of output units $18_1, \ldots, 18_N$ may output only elements of the ciphertext $[k''^{\rightarrow}]$ and the ciphertext $[c^{\rightarrow}]$ corresponding to elements [1] of the ciphertext $[e'''^{\rightarrow}]$. Note that the ciphertext $[[e'''^{\rightarrow}]]$ in FIG. 5(b) corresponds to the ciphertext $[e'''^{\rightarrow}]$. That is, in this case, the plurality of output units $18_1, \ldots, 18_N$ may output first to third elements of the ciphertext $[k''^{\rightarrow}]$ and the ciphertext $[c^{\rightarrow}]$.

Accordingly, group by count can be achieved without decoding by dummy records being set as the least significant records by the negative of dummy flags being arranged in the most significant bits and sorting being performed, and by if statement processing in which a boundary is not established when the flag is 0 being added to a boundary determination bit of a group.

Note that the secure computation devices $1_1, \ldots, 1_N$ may perform so-called null processing. This null processing is implemented, for example, by processing of the second row of "14:" in FIG. 4 performed by the plurality of fourth calculation units $14_1, \ldots, 14_N$.

Figure 4:
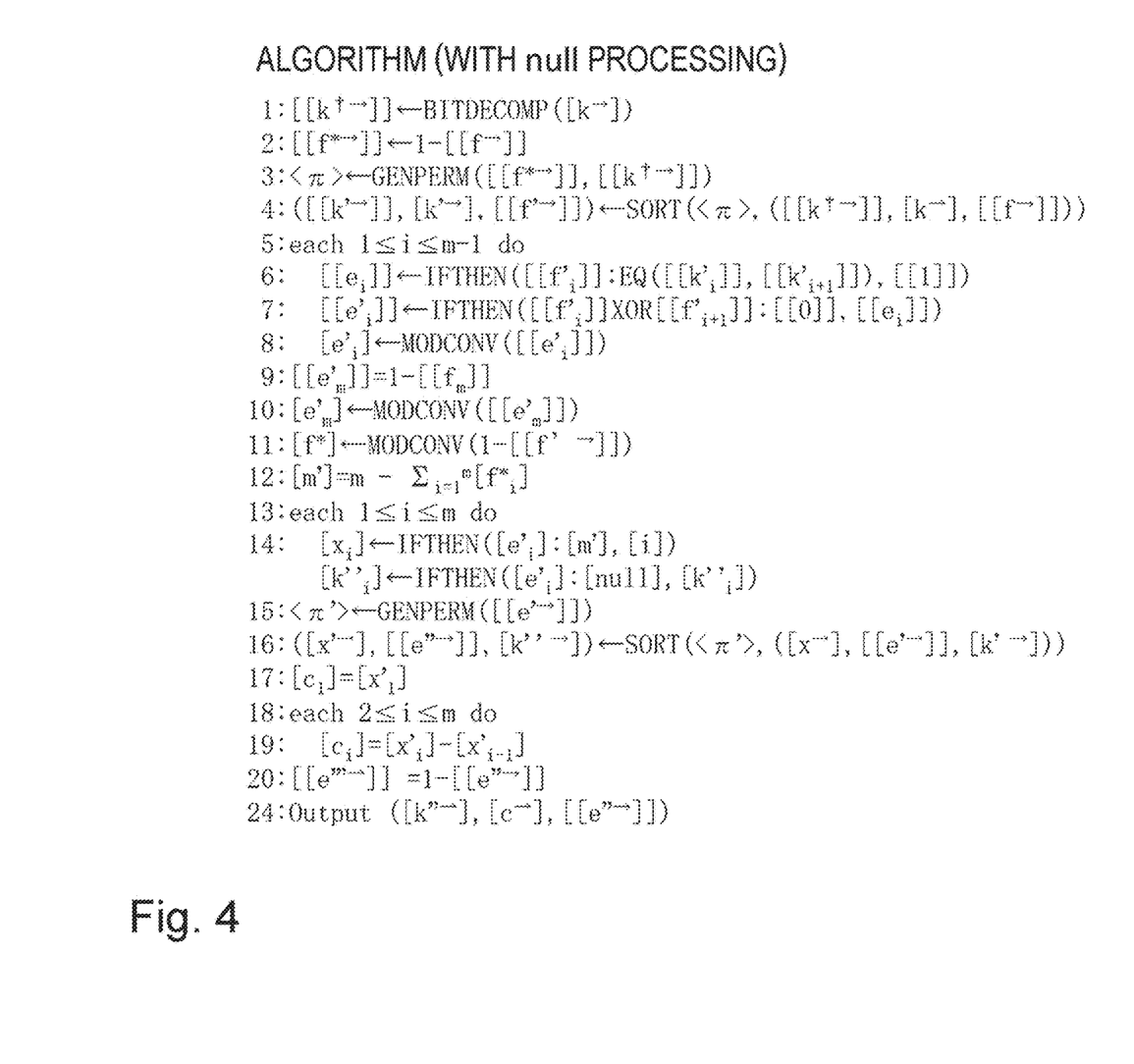
FIG. 4 is a view illustrating an example of an algorithm.

That is, the plurality of fourth calculation units $14_1, \ldots, 14_N$ may, for example, perform the following processing.

$$13: \text{each } 1 \leq i \leq m \text{ do}$$

$$14: [x_i] \leftarrow IFTHEN\big([e_i']:[m']\big), [i]\big)$$

$[k''_i] \leftarrow IFTHEN([e'_i]:[null], [k''_i])$ As a result, for example, the ciphertext $[k''^{\rightarrow}]$ as illustrated in FIG. 5(b) is generated.

Note that records in which the ciphertext $[[e'''^{\rightarrow}]]$ is $[[0]]$ in FIG. 5(b), in other words, records in which the ciphertext $[k''^{\rightarrow}]$ is [null] are dummy records.

MODIFICATIONS

While the embodiment of the present invention has been described above, specific configurations are not limited to the embodiment, and it is needless to say that appropriate design changes, and the like are included in the present invention without deviating from the gist of the present invention.

The various types of processing described in the embodiment may be performed not only in chronological order in accordance with the described order, but also in parallel or individually depending on the processing capability of a device that performs the processing or as necessary.

For example, data exchange between the components of a secure computation device may be performed directly or via a storage unit (not illustrated).

[Program and Recording Medium]

Figure 8:
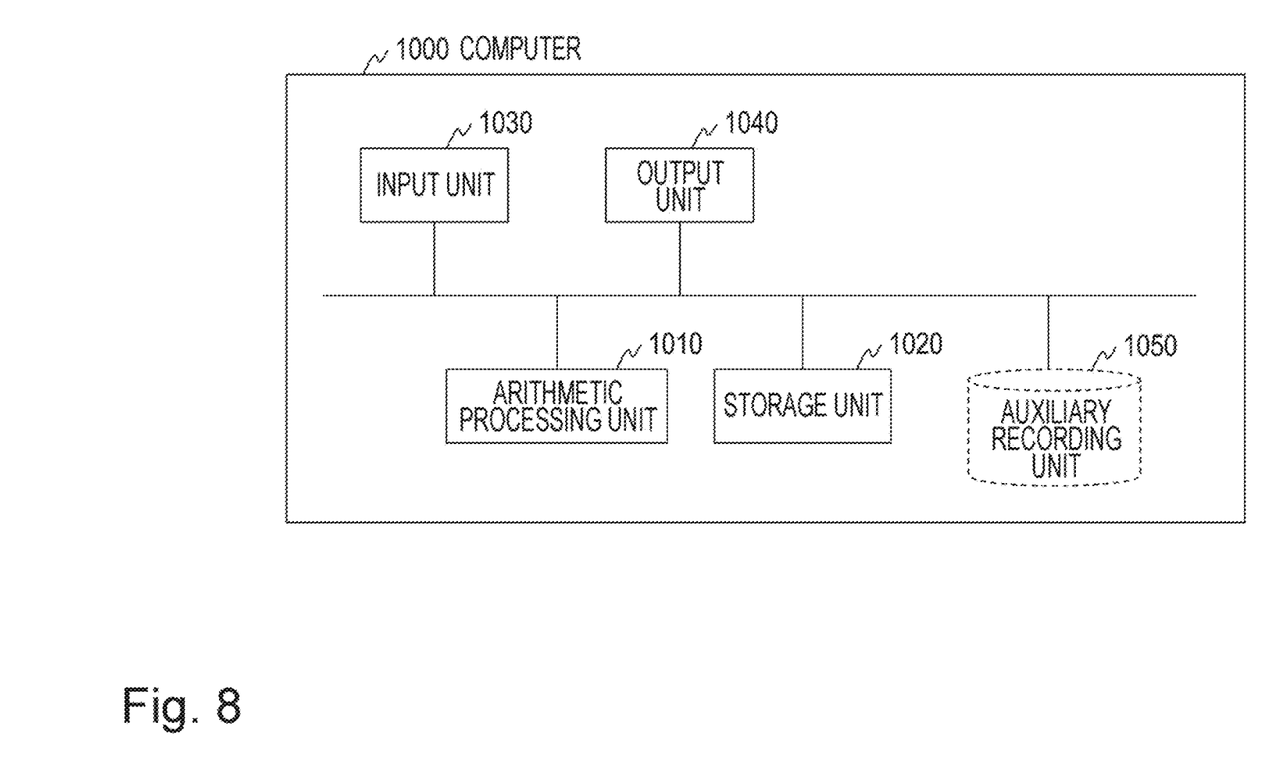
FIG. 8 is a diagram illustrating a functional configuration example of a computer.

The processing of each unit of each of the devices described above may be implemented by a computer, in which case, processing content of a function that each of the devices should have is described by a program. By causing a storage unit 1020 of a computer 1000 illustrated in FIG. 8 to read this program and causing an arithmetic processing unit 1010, an input unit 1030, an output unit 1040, and the like to perform the program, various processing functions in each of the devices described above are implemented on the computer.

The program in which the processing content is described can be recorded in a computer-readable recording medium. The computer-readable recording medium is, for example, a non-transitory recording medium and is specifically a magnetic recording device, an optical disc, or the like.

Further, the program is distributed by, for example, selling, transferring, or renting a portable recording medium such as a DVD and a CD-ROM in which the program is recorded. A configuration in which the program is stored in a storage device in a server computer and the program is distributed by transferring the program from the server computer to other computers via a network may also be employed.

For example, the computer that performs such a program first temporarily stores the program recorded in a portable recording medium or the program transferred from the server computer in an auxiliary recording unit 1050 that is a non-transitory storage device of the computer. Then, at the time of performing processing, the computer reads the program stored in the auxiliary recording unit 1050 that is the non-temporary storage device of the computer into the storage unit 1020 and performs processing in accordance with the read program. In addition, as another embodiment of the program, the computer may directly read the program from the portable recording medium into the storage unit 1020 and per form processing in accordance with the program, and furthermore, the computer may sequentially perform processing in accordance with a received program each time the program is transferred from the server computer to the computer. In addition, the above-described processing may be performed by a so called application service provider (ASP) type service that implements a processing function only by a performance instruction and result acquisition without transferring the program from the server computer to the computer. The program in the present embodiment includes information used for processing of an electronic computer and equivalent to the program (data or the like that is not a direct command to the computer but has a property of defining processing of the computer).

Although the present devices are each configured by performing a predetermined program on a computer in the present embodiment, at least part of the processing content may be implemented by hardware.

In addition, it is needless to say that modifications can be appropriately made without departing from the gist of the present invention.

The invention claimed is:

1. A secure computation system comprising a plurality of secure computation devices
in which m is a number of records and is an integer of 1 or more, $\vec{k}$ is a vector of a key $\vec{k}=(k_1, \ldots, k_m)$, $\vec{f}$ is a vector of a flag $\vec{f}=(f_1, \ldots, f_m)$, $[\alpha]$ is a ciphertext of $\alpha$ with $\alpha$ set as any value or any vector, and a predetermined operation using $\alpha$ as a ciphertext is possible,
wherein the plurality of secure computation devices comprises processing circuitry configured to:
generate a ciphertext $[\vec{f'}]$ and a ciphertext $[\vec{k'}]$ of a vector $\vec{f'}$ and a vector $\vec{k'}$ obtained by sorting the vector $\vec{f}$ and the vector $\vec{k}$, respectively, with a vector obtained by concatenating negative of the vector $\vec{f}$ and the vector $\vec{k}$ set as a key, using a ciphertext $[\vec{f}]$ of the vector $\vec{f}$ and a ciphertext $[\vec{k}]$ of the vector $\vec{k}$;
generate a ciphertext $[\vec{e'}]$ of a vector $\vec{e'}$ including $e'_i$ (i=1, ..., m) as an element by generating a ciphertext $[e'_m]$ of $e'_m$ such that $e'_i=0$ is satisfied when $f'_i=1$ and $k'_i \neq k'_{i+1}$ or $f'_i=1$ and $f_{i+1}=0$ are satisfied, and $e'_i=1$ is satisfied, and $e'_m=0$ is satisfied when $f'_m=1$ is satisfied or otherwise $e'_m=1$ is satisfied, with i=1, ..., m-1 set, using the ciphertext $[\vec{f'}]$ and the ciphertext $[\vec{k'}]$;
generate a ciphertext $[m']$ of $m'$ with a result obtained by subtracting a number of records having a flag of 0 from the m set as $m'$, using at least the m;
generate a ciphertext $[\vec{x}]$ of a vector $\vec{x}$ including $x_i$ (i=1, ..., m) as an element by generating a ciphertext $[x_i]$ of $x_i$ having a value of i when an element $e_i=0$ is satisfied, the element $e_i$ being an element of the vector $\vec{e}$, and a value of $m'$ when an element $e_i=1$ is satisfied, the element $e_i$ being an element of the vector $\vec{e}$, with i=1, ..., m set, using the ciphertext $[\vec{e'}]$;
obtain a ciphertext $[\vec{x'}]$, a ciphertext $[\vec{k''}]$, and a ciphertext $[\vec{e''}]$ of a vector $\vec{x'}$, a vector $\vec{k''}$, and a vector $\vec{e''}$ obtained by sorting the vector $\vec{x}$, the vector $\vec{k'}$, and the vector $\vec{e'}$, respectively, with the vector $\vec{e'}$ set as a key, using the ciphertext $[\vec{e'}]$, the ciphertext $[\vec{x}]$, and the ciphertext $[\vec{k'}]$;
generate a ciphertext $[\vec{c}]$ of a vector $\vec{c}$ including $c_i$ (i=1, ..., m) as an element by generating a ciphertext $[c_i]$ of $c_i$ that is a value obtained by subtracting an element $x'_{i-1}$ from an element $x'_i$ of the vector $\vec{x'}$ with a ciphertext $[x'_1]$ of an element $x'_1$ of the vector $\vec{x'}$ set as a ciphertext $[c_1]$ and with i=2, ..., m set, using the ciphertext $[\vec{x''}]$; and
calculate a ciphertext $[\vec{e'''}]$ of a vector $\vec{e'''}$ including a value obtained by subtracting each element of the vector $\vec{e''}$ from 1, using the ciphertext $[\vec{e''}]$.

2. The secure computation system according to claim 1, wherein the processing circuitry further configured to output the ciphertext $[\vec{k''}]$, the ciphertext $[\vec{c}]$, and the ciphertext $[\vec{e'''}]$.

3. The secure computation system according to claim 1, wherein the processing circuitry further configured to output a result obtained by deleting an element corresponding to an element indicating a dummy record among elements $e'''_i$ of a vector $\vec{e'''}$ from the ciphertext $[\vec{k''}]$ and the ciphertext $[\vec{c}]$, using the ciphertext $[\vec{k''}]$, the ciphertext $[\vec{c}]$, and the ciphertext $[\vec{e'''}]$.

4. A secure computation device of the secure computation system according to claim 1.

5. A secure computation method in which m is a number of records and is an integer of 1 or more, $\vec{k}$ is a vector of a key $\vec{k}=(k_1, \ldots, k_m)$, $\vec{f}$ is a vector of a flag $\vec{f}=(f_1, \ldots, f_m)$, $[\alpha]$ is a ciphertext of $\alpha$ with $\alpha$ set as any value or any vector, and a predetermined operation using $\alpha$ as a ciphertext is possible, the secure computation method comprising:
a first calculation step in which a plurality of first calculation units generates a ciphertext $[\vec{f'}]$ and a ciphertext $[\vec{k'}]$ of a vector $\vec{f'}$ and a vector $\vec{k'}$ obtained by sorting the vector $\vec{f}$ and the vector $\vec{k}$, respectively, with a vector obtained by concatenating negative of the vector $\vec{f}$ and the vector $\vec{k}$ set as a key, using a ciphertext $[\vec{f}]$ of the vector $\vec{f}$ and a ciphertext $[\vec{k}]$ of the vector $\vec{k}$;
a second calculation step in which a plurality of second calculation units generates a ciphertext $[\vec{e'}]$ of a vector $\vec{e'}$ including $e'_i$ (i=1, ..., m) as an element by generating a ciphertext $[e'_m]$ of $e'_m$ such that $e'_i=0$ is satisfied when $f'_i=1$ and $k'_i \neq k'_{i+1}$ or $f'_i=1$ and $f_{i+1}=0$ are satisfied or otherwise $e'_i=1$ is satisfied, and $e'_m=0$ is satisfied when $f'_m=1$ is satisfied or otherwise $e'_m=1$ is satisfied, with i=1, ..., m-1 set, using the ciphertext $[\vec{f'}]$ and the ciphertext $[\vec{k'}]$;
a third calculation step in which a plurality of third calculation units generates a ciphertext $[m']$ of $m'$ with a result obtained by subtracting a number of records having a flag of 0 from the m set as $m'$, using at least the m;
a fourth calculation step in which a plurality of fourth calculation units generates a ciphertext $[\vec{x}]$ of a vector $\vec{x}$ including $x_i$ (i=1, ..., m) as an element by generating a ciphertext $[x_i]$ of $x_i$ having a value of i when an element $e_i=0$ is satisfied, the element $e_i$ being an element of the vector $\vec{e}$, and a value of $m'$ when an element $e_i=1$ is satisfied, the element ei being an element of the vector $\vec{e}$, with i=1, ..., m set, using the ciphertext $[\vec{e'}]$;
a fifth calculation step in which a plurality of fifth calculation units obtains a ciphertext $[\vec{x'}]$, a ciphertext $[\vec{k''}]$, and a ciphertext $[\vec{e''}]$ of a vector $\vec{x'}$, a vector $\vec{k''}$, and a vector $\vec{e''}$ obtained by sorting the vector $\vec{x}$, the vector $\vec{k'}$, and the vector $\vec{e'}$, respectively, with the vector $\vec{e'}$ set as a key, using the ciphertext $[\vec{e'}]$, the ciphertext $[\vec{x}]$, and the ciphertext $[\vec{k'}]$;
a sixth calculation step in which a plurality of sixth calculation units generates a ciphertext $[\vec{c}]$ of a vector $\vec{c}$ including $c_i$ (i=1, ..., m) as an element by generating a ciphertext $[c_i]$ of $c_i$ that is a value obtained by subtracting an element $x'_{i-1}$ from an element $x'_i$ of the vector $\vec{x'}$ with a ciphertext $[x'_1]$ of an element $x'_1$ of the vector $\vec{x'}$ set as a ciphertext $[c_1]$ and with i=2, ..., m set, using the ciphertext $[\vec{x''}]$; and
a seventh calculation step in which a plurality of seventh calculation units calculates a ciphertext $[\vec{e'''}]$ of a vector $\vec{e'''}$ including a value obtained by subtracting each element of the vector $\vec{e''}$ from 1, using the ciphertext $[\vec{e''}]$.

6. A non-transitory computer readable medium that stores a program for causing a computer to function as each step of the secure computation method according to claim 5.

* * * * *